D. W. JOHNSON.
WINDING DEVICE FOR TATTING SHUTTLES.
APPLICATION FILED MAY 12, 1917.
1,259,629. Patented Mar. 19, 1918.
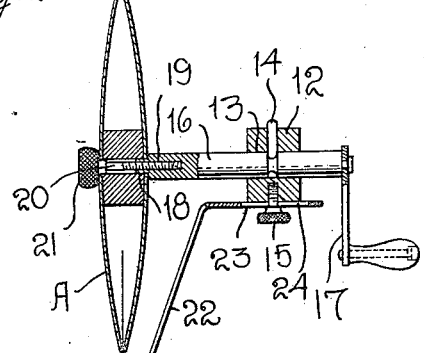
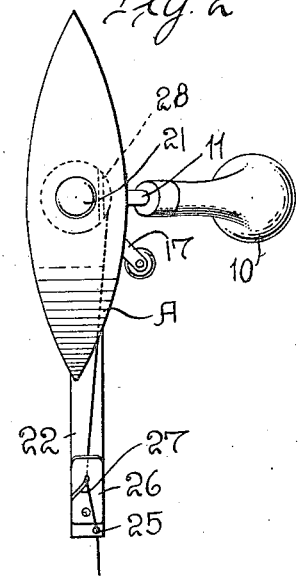
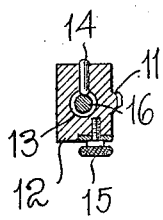
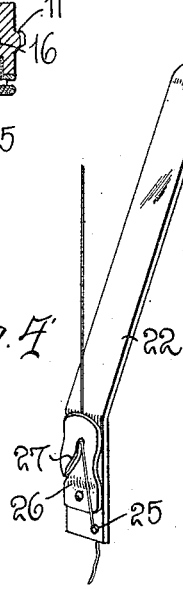
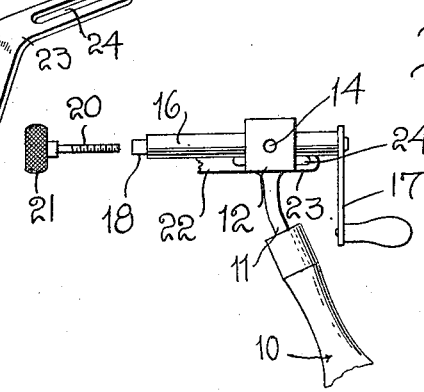
Inventor
DANIEL W. JOHNSON
By Watson E. Coleman
Attorney

UNITED STATES PATENT OFFICE.

DANIEL W. JOHNSON, OF SAGINAW WEST SIDE, MICHIGAN.

WINDING DEVICE FOR TATTING-SHUTTLES.

1,259,629.  Specification of Letters Patent.  Patented Mar. 19, 1918.

Application filed May 12, 1917. Serial No. 168,160.

*To all whom it may concern:*

Be it known that DANIEL W. JOHNSON, a citizen of the United States, residing at Saginaw West Side, in the county of Saginaw and State of Michigan, has invented certain new and useful Improvements in Winding Devices for Tatting-Shuttles, of which the following is a specification, reference being had to the accompanying drawings.

This invention relates to devices for winding tatting shuttles and the general object of the invention is to provide a very simple, mechanically operated and effective device of this character.

A further object is to provide a construction of this character in which the shuttle may be readily attached to or detached from the winding device and to provide an adjustable guide and tensioning means for the thread.

Other objects will appear in the course of the following description.

My invention is illustrated in the accompanying drawings, wherein:—

Figure 1 is a sectional view of my improved winding device;

Fig. 2 is a front elevation thereof;

Fig. 3 is a transverse sectional view through the head 12;

Fig. 4 is a perspective view of the tensioning bracket and tensioning spring;

Fig. 5 is a top plan view of the parts with the shuttle removed.

Referring to these figures, 10 designates the handle of the device having a shank 11 formed with a head 12, this head being formed with a central bore 13. This head 12 is formed on one side with a bore in which a pin 14 is disposed projecting into the bore and on the opposite side the head is formed with a screw-threaded socket for the reception of a screw 15. The pin 14 engages with a groove formed in a spindle 16, and detachably holds the spindle in place in the head 12, but permits the rotation of the spindle.

Disposed within the bore 13 is the spindle 16 which extends entirely through the head and is formed at one end for the reception of a crank handle 17 whereby the spindle may be rotated and at its other end is reduced as at 18 for insertion into the central opening of a shuttle A and this end of the spindle is provided with a screw-threaded bore 19. A screw 20 is adapted to be inserted through the central opening in the shuttle and into this bore 19, this screw being provided with a knurled head 21.

The thread is guided onto the shuttle and tensioned by means of a thread guide comprising a strip of metal 22, which is angularly bent at one end, as at 23, to fit against the head 11, this angular end of the strip being formed with a longitudinally extending slot 24 through which the screw 15 passes. The outer end of the strip is formed at its extremity with a perforation 25 and inward of this perforation with a resilient plate 26 having a diagonal slot 27 extending inward from one end.

In the operation of this device the thread to be wound on the shuttle is first passed through the opening 25 and is then passed into the shuttle and into a perforation 28 formed in the hub of the shuttle as usual, the thread being tied. The shuttle may then be disposed upon the spindle 16 and held in place by the screw 20 and then the thread is engaged in the diagonal slot 27 of the spring 26. Under these circumstances, rotation of the spindle by means of the handle 17 will cause the thread to be wound up on the shuttle, the thread being kept under proper tension by passing through the spring plate 26.

It will be seen that the shuttle may be readily removed or replaced and that the component parts of the device may be readily taken apart for packing or as readily put together. The device is extremely simple, can be cheaply made, and has been found thoroughly effective in actual practice.

With my device the shuttle may be attached much more conveniently than on other winding devices known to me, and further, in my construction, the shuttle is not pulled out of shape by the winding device or spread, as is often the case with other winding devices known to me. Furthermore, the thread will be wound evenly and tightly upon the shuttle for the full length of the shuttle and inasmuch as the device may be readily disassembled, it can be carried easily in the work bag.

Having described my invention, what I claim is:—

A device for winding tatting shuttles comprising a handle having a head, a stem rotatably mounted in the head, a handle for rotating the stem, one end of the stem being formed to engage a tatting shuttle, a thread guide comprising a strip angularly bent, one end of the strip being formed with a slot and disposed against the side of the head, a screw passing through said slot and into the head and holding the thread guide in adjusted position, the outer end of the guide being disposed approximately in the plane of the shuttle end of said stem and having a perforation through which the thread is passed, and a tensioning spring mounted upon said outer end of the strip and having a slot through which the thread is passed.

In testimony whereof I hereunto affix my signature in the presence of two witnesses.

DANIEL W. JOHNSON.

Witnesses:
DONALD F. FERRINGTON,
WALTER A. BAUER.